(12) United States Patent
Takano et al.

(10) Patent No.: US 11,322,776 B2
(45) Date of Patent: May 3, 2022

(54) CO-FIRED ALL-SOLID-STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Takeo Ishikura, Nagaokakyo (JP); Akisuke Ito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 372 days.

(21) Appl. No.: 16/702,869

(22) Filed: Dec. 4, 2019

(65) Prior Publication Data

US 2020/0106130 A1   Apr. 2, 2020

Related U.S. Application Data

(63) Continuation of application No. PCT/JP2018/031939, filed on Aug. 29, 2018.

(30) Foreign Application Priority Data

Aug. 30, 2017   (JP) .............................. JP2017-165458
Nov. 13, 2017   (JP) .............................. JP2017-218080

(51) Int. Cl.
*H01M 10/0562*   (2010.01)
*H01M 4/485*   (2010.01)
*H01M 10/0525*   (2010.01)
*H01M 10/0585*   (2010.01)

(52) U.S. Cl.
CPC ....... *H01M 10/0562* (2013.01); *H01M 4/485* (2013.01); *H01M 10/0525* (2013.01); *H01M 10/0585* (2013.01); *H01M 2300/0071* (2013.01)

(58) Field of Classification Search
CPC ......... H01M 10/0562; H01M 10/0525; H01M 10/0585; H01M 4/485; H01M 2300/0071
See application file for complete search history.

(56) References Cited

U.S. PATENT DOCUMENTS 9,537,175 B2   1/2017   Kintaka
10,361,452 B2   7/2019   Nishizaki et al.
(Continued)

FOREIGN PATENT DOCUMENTS

JP   2012059529 A   3/2012
JP   2013037992 A   2/2013
(Continued)

OTHER PUBLICATIONS

International Search Report issued for PCT/JP2018/031939, dated Nov. 27, 2018.
(Continued)

*Primary Examiner* — Matthew J Merkling
(74) *Attorney, Agent, or Firm* — ArentFox Schiff LLP (57) ABSTRACT

A co-fired all-solid-state battery that includes a negative electrode, a solid electrolyte layer, and a positive electrode. The negative electrode contains a negative electrode active material and a garnet-type solid electrolyte. The negative electrode active material contains Li, V, and O. The negative electrode active material has a mole ratio (Li/V) of a Li content to a V content of 2.0 or more. The garnet-type solid electrolyte contains Li, La, Zr, and O.

20 Claims, 2 Drawing Sheets

(56) References Cited

U.S. PATENT DOCUMENTS

| | | | |
|---|---|---|---|
| 2011/0244337 A1* | 10/2011 | Ohta | H01M 10/0562 429/319 |
| 2014/0186720 A1 | 7/2014 | Kintaka | |
| 2014/0308576 A1* | 10/2014 | Gaben | H01M 4/0404 429/185 |
| 2015/0295224 A1* | 10/2015 | Onodera | H01M 4/0471 156/52 |
| 2016/0013513 A1* | 1/2016 | Gaben | H01M 4/0428 429/159 |
| 2018/0175446 A1 | 6/2018 | Nishizaki et al. | |
| 2019/0341601 A1* | 11/2019 | Park | H01M 10/0525 |
| 2020/0152925 A1* | 5/2020 | Gaben | H01M 10/0562 |
| 2020/0266445 A1* | 8/2020 | Tsukada | H01M 10/0585 |

FOREIGN PATENT DOCUMENTS

| | | |
|---|---|---|
| JP | 2014170734 A | 9/2014 |
| JP | 2015056326 A | 3/2015 |
| JP | 2015204215 A | 11/2015 |
| JP | 2016110792 A | 6/2016 |
| JP | 2016184483 A | 10/2016 |
| JP | 2017033926 A | 2/2017 |
| JP | 2017103163 A | 6/2017 |
| WO | 2018123479 A1 | 7/2018 |

OTHER PUBLICATIONS

Written Opinion of the International Searching Authority issued for PCT/JP2018/031939, dated Nov. 27, 2018.
International Search Report issued in PCT/JP2018/031938, dated Nov. 27, 2018.
Written Opinion of the International Searching Authority issued in PCT/JP2018/031938, dated Nov. 27, 2018.

* cited by examiner

CO-FIRED ALL-SOLID-STATE BATTERY

CROSS REFERENCE TO RELATED APPLICATIONS

The present application is a continuation of International application No. PCT/JP2018/031939, filed Aug. 29, 2018, which claims priority to Japanese Patent Application No. 2017-165458, filed Aug. 30, 2017, and Japanese Patent Application No. 2017-218080, filed Nov. 13, 2017, the entire contents of each of which are incorporated herein by reference.

FIELD OF THE INVENTION

The present invention relates to a co-fired all-solid-state battery.

BACKGROUND OF THE INVENTION

Conventionally, an all-solid-state battery has been known as a battery having excellent reliability and safety. For example, Patent Document 1 discloses a solid electrolyte material having a garnet crystal structure as a solid electrolyte material used for the all-solid-state battery.

Patent Document 1: Japanese Patent Application Laid-Open No. 2014-170734

SUMMARY OF THE INVENTION

Patent Document 1 describes that an electrode may contain a solid electrolyte.

The inventors of the present invention have, as a result of an earnest study, found that an all-solid-state battery that includes a negative electrode containing a garnet-type solid electrolyte is sometimes not capable of achieving good characteristics when produced by co-firing.

A main object of the present invention is to provide a co-fired all-solid-state battery that includes a negative electrode containing a garnet-type solid electrolyte and that has good characteristics.

A co-fired all-solid-state battery according to the present invention includes a negative electrode, a solid electrolyte layer, and a positive electrode. The negative electrode contains a negative electrode active material and a garnet-type solid electrolyte. The solid electrolyte layer is disposed on the negative electrode. The positive electrode is disposed on the solid electrolyte layer. The negative electrode active material contains Li, V, and O. The negative electrode active material has a mole ratio (Li/V) of a Li content to a V content of 2.0 or more. The garnet-type solid electrolyte contains Li, La, Zr, and O.

According to the present invention, it is possible to provide a co-fired all-solid-state battery that includes a negative electrode active material layer containing a garnet-type solid electrolyte and that has good characteristics.

DETAILED DESCRIPTION OF PREFERRED EMBODIMENTS OF THE INVENTION

Hereinafter, one preferable exemplary embodiment of the present invention is described. The following embodiment, however, is no more than an example, and the present invention is not limited thereby.

Figure 1:
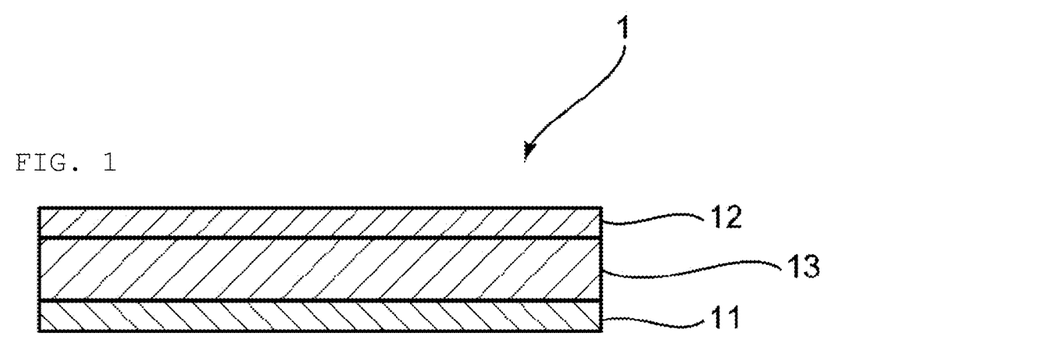
FIG. 1 is a schematic sectional view illustrating an all-solid-state battery according to one embodiment of the present invention.

FIG. 1 is a schematic sectional view illustrating a co-fired all-solid-state battery 1 according to the present embodiment.

As illustrated in FIG. 1, the co-fired all-solid-state battery 1 includes a negative electrode 12, a positive electrode 11, and a solid electrolyte layer 13. The solid electrolyte layer 13 is disposed on and in contact with the negative electrode 12. The positive electrode 11 is disposed on and in contact with the solid electrolyte layer 13. That is, the solid electrolyte layer 13 is sandwiched between the positive electrode 11 and the negative electrode 12. The positive electrode 11 and the negative electrode 12 are each joined with the solid electrolyte layer 13 by sintering. That is, the positive electrode 11, the solid electrolyte layer 13, and the negative electrode 12 are an integrated sintered body.

The "co-fired all-solid-state battery" in the present embodiment refers to an all-solid-state battery that is formed of a co-fired product obtained by co-firing a stacked body including a green sheet for constituting the negative electrode, a green sheet for constituting the solid electrolyte layer, and a green sheet for constituting the positive electrode.

(Positive Electrode 11)

The positive electrode 11 contains positive electrode active material grains. Examples of the positive electrode active material grains that are preferably used include lithium-containing phosphate compound grains having a NASICON-type structure, lithium-containing phosphate compound grains having an olivine-type structure, lithium-containing layered oxide grains, and lithium-containing oxide grains having a spinel-type structure. Specific examples of the lithium-containing phosphate compound having a NASICON-type structure that is preferably used include $Li_3V_2(PO_4)_3$. Specific examples of the lithium-containing phosphate compound having an olivine-type structure that is preferably used include $Li_3Fe_2(PO_4)_3$ and $LiMnPO_4$. Specific examples of the lithium-containing layered oxide grains that are preferably used include $LiCoO_2$, $LiCo_{1/3}Ni_{1/3}Mn_{1/3}O_2$. Specific examples of the lithium-containing oxide having a spinel-type structure that is preferably used include $LiMn_2O_4$, $LiNi_{0.5}Mn_{1.5}O_4$, and $Li_4Ti_5O_{12}$. Among these materials, the lithium-containing layered oxide such as $LiCoO_2$ or $LiCo_{1/3}Ni_{1/3}Mn_{1/3}O_2$ is more preferably used in the present embodiment that uses the following negative electrode active material and garnet-type solid electrolyte. These types of positive electrode active material grains may be used singly or in combination of a plurality of types of grains.

The positive electrode 11 may further contain a solid electrolyte. A type of the solid electrolyte contained in the positive electrode 11 is not particularly limited, but the positive electrode 11 preferably contains the same type of solid electrolyte as the solid electrolyte contained in the solid electrolyte layer 13 described later.

(Negative Electrode 12)

The negative electrode 12 contains a negative electrode active material and a garnet-type solid electrolyte.

The negative electrode active material contains Li, V, and O. That is, the negative electrode active material is a composite oxide containing Li and V. This composite oxide containing Li and V has a mole ratio (Li/V) of a Li content to a V content of 2.0 or more.

Examples of the negative electrode active material include an active material represented by a general formula $(Li_{[3-ax+(5-b)y]}A_x)(V_{1-y}B_y)O_4$, where A is at least one element selected from the group consisting of Mg, Al, Ga, and Zn; B is at least one element selected from the group consisting of Zn, Al, Ga, Si, Ge, P, and Ti; $0 \leq x \leq 1.0$; $0 \leq y \leq 0.6$; a is an average valence of A; and b is an average valence of B. In the general formula $(Li_{[3-ax+(5-b)y]}A_x)(V_{1-y}B_y)O_4$, Li may be partially substituted with, for example, Na, K, Ca, Fe, Cr, or Co. Further, in the general formula $(Li_{[3-ax+(5-b)y]}A_x)(V_{1-y}B_y)O_4$, V may be partially substituted with, for example, Zn, Al, Ga, Sn, As, Mo, W, Fe, Cr, or Co.

Specific examples of the negative electrode active material that is preferably used include $Li_3VO_4$, $Li_{3.2}V_{0.8}Si_{0.2}O_4$, $Li_{3.2}V_{0.8}Ge_{0.2}O_4$, $Li_{3.2}V_{0.7}Ti_{0.3}O_4$, $Li_{2.7}Al_{0.1}VO_4$, $Li_{2.4}Al_{0.2}VO_4$, $Li_{2.7}Ga_{0.1}VO_4$, $Li_{2.8}Zn_{0.1}VO_4$, $Li_{2.0}Zn_{0.5}VO_4$, $Li_{3.0}Zn_{0.1}V_{0.8}Si_{0.2}O_4$, and $Li_{3.0}V_{0.7}P_{0.3}O_4$.

A crystal structure of the negative electrode active material is not particularly limited. The negative electrode active material has, for example, preferably a $\beta_{II}$-$Li_3VO_4$ structure or a $\gamma_{II}$-$Li_3VO_4$ structure, further preferably a $\gamma_{II}$-$Li_3VO_4$ structure.

Charge and discharge of the co-fired all-solid-state battery 1 cause insertion and extraction of Li to sometimes change the crystal structure of the negative electrode active material.

The negative electrode 12 has a content of the negative electrode active material of preferably 20 vol % to 80 vol %, more preferably 30 vol % to 70 vol %. When the negative electrode 12 has an excessively large content of the negative electrode active material, the negative electrode active material present in the negative electrode 12 does not suitably function to sometimes lower the battery characteristics of the co-fired all-solid-state battery 1. On the other hand, when the negative electrode 12 has an excessively small content of the negative electrode active material, it becomes sometimes difficult to attain high energy density of the co-fired all-solid-state battery 1.

In the negative electrode 12, the negative electrode active material is preferably present as negative electrode active material grains. In the negative electrode 12, the negative electrode active material grains have an average grain size of preferably 0.005 µm to 5.0 µm, further preferably 0.1 µm to 1.5 µm. The negative electrode active material grains having an excessively large average grain size lower the use efficiency of the negative electrode active material present in the negative electrode active material grains to sometimes lower the reversible capacitance of the co-fired all-solid-state battery 1. On the other hand, the negative electrode active material grains having an excessively small average grain size lower the use efficiency of the negative electrode active material contained in the negative electrode active material grains present in the negative electrode 12 to sometimes lower the battery characteristics of the co-fired all-solid-state battery 1.

The average grain size of the negative electrode active material grains can be determined by statistical processing of equivalent circle diameters of the active material grains in a SEM image of a section of a sintered body or a TEM image with use of image analysis software manufactured by Asahi Kasei Engineering Corporation.

The negative electrode 12 further contains a garnet-type solid electrolyte in addition to the negative electrode active material. The garnet-type solid electrolyte contained in the negative electrode 12 contains Li, La, Zr, and O. That is, the garnet-type solid electrolyte contained in the negative electrode 12 is a Li—La—Zr composite oxide.

Examples of the garnet-type solid electrolyte contained in the negative electrode 12 include a solid electrolyte represented by a general formula $(Li_{[7-ax-(b-4)y]}A_x)La_3(Zr_{2-y}B_y)O_{12}$, where A is at least one element selected from the group consisting of Ga, Al, Mg, Zn, and Sc; B is at least one element selected from the group consisting of Nb, Ta, W, Te, Mo, and Bi; $0 \leq x \leq 0.5$; $0 \leq y \leq 2.0$; a is an average valence of A; and b is an average valence of B. The garnet-type solid electrolyte represented by the general formula has high ion conductivity. Therefore, the use of the garnet-type solid electrolyte represented by the general formula enables an improvement of charge and discharge rate characteristics of the co-fired all-solid-state battery 1.

Specific examples of the garnet-type solid electrolyte that is preferably used and contained in the negative electrode 12 include $(Li_{6.4}Ga_{0.05}Al_{0.15})La_3Zr_2O_{12}$, $Li_{6.6}La_3(Zr_{1.6}Ta_{0.4})O_{12}$, $Li_{6.6}La_3(Zr_{1.6}Ta_{0.4})O_{12}$, $(Li_{6.4}Al_{0.2})La_3Zr_2O_{12}$, $(Li_{6.4}Ga_{0.15}Sc_{0.05})La_3Zr_2O_{12}$, $Li_{6.75}La_3Zr_{1.75}Nb_{0.25}Zr_2O_{12}$, $(Li_{6.45}Al_{0.1})La_3(Zr_{1.75}Nb_{0.2.5})O_{12}$, and $(Li_{6.4.5}Al_{0.1})La_3(Zr_{1.75}Bi_{0.2.5})O_{12}$.

The negative electrode 12 has a content of the garnet-type solid electrolyte of preferably 5 vol % to 60 vol %, more preferably 10 vol % to 40 vol %.

The negative electrode 12 preferably further contains a conductive auxiliary agent. Examples of the conductive auxiliary agent that is preferably used include metal materials such as Ag, Cu, Ni, and Sn, and carbon materials such as acetylene black, ketjen black, Super P, and carbon nanotube (e.g., VGCF (registered trademark)).

The conductive auxiliary agent may be disposed so as to coat at least part of the negative electrode active material grains. Such coating enables an increase in contact area between the conductive auxiliary agent and the negative electrode active material grains. Therefore, it is possible to lower the charge transfer resistance.

The negative electrode 12 has a volume proportion of the conductive auxiliary agent ((volume of conductive auxiliary agent/volume of negative electrode)×100) of preferably 0.1 vol % to 35 vol %, more preferably 1.0 vol % to 15 vol %. The negative electrode 12 having an excessively low volume proportion ((volume of conductive auxiliary agent/volume of negative electrode)×100) sometimes lowers the use efficiency of the negative electrode active material. The negative electrode 12 having an excessively high volume proportion ((volume of conductive auxiliary agent/volume of negative electrode)×100) sometimes excessively lowers the volume proportion accounted for by the negative electrode active material in the negative electrode.

The negative electrode 12 preferably further contains a sintering additive. The negative electrode 12 containing the sintering additive is capable of lowering a firing temperature of the co-fired all-solid-state battery 1. This effect enables suppression of dispersion of an element in an interface between the negative electrode active material and the garnet-type solid electrolyte.

The sintering additive preferably contains Li, M, and O (M is at least one element other than Li and O). That is, the sintering additive is preferably a Li-M (M is at least one element other than Li and O) composite oxide.

The sintering additive more preferably contains Li, B, and O. That is, the sintering additive is more preferably a composite oxide containing Li and B.

Earnest examination by the inventors of the present invention has resulted in clarifying that a Li—B composite oxide having a mole ratio (Li/B) of Li to B of 2.0 or more is more preferably used as the sintering additive. This sintering additive has a low-melting property to allow easy progress of liquid-phase sintering and thus enable densification of the negative electrode 12 at a lower temperature. Further, the sintering additive that is made to have the above composition has been clarified to be capable of suppressing a side reaction between the sintering additive and the negative electrode active material during co-firing. Accordingly, the sintering additive is further preferably a Li—B composite oxide having a mole ratio (Li/B) of a Li content to a B content of 2.0 or more, further preferably a Li—B composite oxide having a mole ratio (Li/B) of 2.4 or more. The Li—B composite oxide, however, has a mole ratio (Li/B) of preferably 5.0 or less, more preferably 3.0 or less.

Specific examples of the sintering additive that is preferably used include $Li_{2.4}Al_{0.2}BO_3$, $Li_4B_2O_5$, $Li_3BO_3$, and $Li_{2.4}Al_{0.2}BO_3$.

The negative electrode 12 has a volume proportion of the sintering additive ((volume of sintering additive/volume of negative electrode)×100) of preferably 0.1 vol % to 30 vol %, more preferably 0.5 vol % to 15 vol %.

(Solid Electrolyte Layer 13)

The solid electrolyte layer 13 is a layer containing a solid electrolyte. A type of the solid electrolyte contained in the solid electrolyte layer 13 is not particularly limited. The solid electrolyte layer 13 preferably contains the same type of solid electrolyte as the solid electrolyte contained in the negative electrode 12.

As described above, in the co-fired all-solid-state battery 1 according to the present invention, the negative electrode contains a negative electrode active material and a garnet-type solid electrolyte. The negative electrode active material contains Li, V, and O. The negative electrode active material has a mole ratio (Li/V) of a Li content to a V content of 2.0 or more. The garnet-type solid electrolyte contains Li, La, Zr, and O. Therefore, as understood from results of the following examples and comparative examples, the co-fired all-solid-state battery 1 has excellent battery characteristics (for example, initial reversible capacitance). A reason for this is considered to be that the use of the negative electrode active material and the garnet-type solid electrolyte described above is capable of suppressing the progress of an undesired reaction such as a reaction between the negative electrode active material and the garnet-type solid electrolyte during co-firing.

From a viewpoint of more effectively suppressing the progress of an undesired reaction such as a reaction between the negative electrode active material and the garnet-type solid electrolyte during co-firing, the negative electrode active material preferably has a $\beta_{II}$-$Li_3VO_4$ structure or a $\gamma_{II}$-$Li_3VO_4$ structure. The negative electrode active material having the $\beta_{II}$-$Li_3VO_4$ structure or the $\gamma_{II}$-$Li_3VO_4$ structure is capable of increasing the energy density of the co-fired all-solid-state battery 1.

Of these structures, the negative electrode active material further preferably has the $\gamma_{II}$-$Li_3VO_4$ structure. The negative electrode active material having the $\gamma_{II}$-$Li_3VO_4$ structure increases the ion conductivity to be capable of improving the charge and discharge characteristics of the co-fired all-solid-state battery 1. The $\gamma_{II}$-$Li_3VO_4$ structure is sometimes easily attainable by partially substituting V contained in the negative electrode active material with, for example, Ti, Si, Ge, or P.

The negative electrode active material having an excessively low mole ratio (Li/V) easily allows Li to be dispersed from the garnet-type solid electrolyte into the negative electrode active material to sometimes easily denature the solid electrolyte. On the other hand, the negative electrode active material having an excessively high mole ratio (Li/V) decreases the amount of V contributing to the battery capacitance to sometimes decrease the capacitance of the co-fired all-solid-state battery 1. Accordingly, the negative electrode active material has a mole ratio (Li/V) of preferably 8 or less, further preferably 4 or less.

(Method for Manufacturing Co-Fired All-Solid-State Battery 1)

Next, one exemplary method for manufacturing the co-fired all-solid-state battery 1 is described.

First, a paste is prepared by appropriately mixing, for example, a solvent and a resin with active material particles and a solid electrolyte. The paste is applied onto a sheet and dried to form a first green sheet for constituting the positive electrode 11. In the same manner, a second green sheet for constituting the negative electrode 12 is formed.

A conductive auxiliary agent or a sintering additive may be added to the second green sheet.

A paste is prepared by appropriately mixing, for example, a solvent and a resin with a solid electrolyte. The paste is applied and dried to produce a third green sheet for constituting the solid electrolyte layer 13.

Next, the first to third green sheets are appropriately stacked to produce a stacked body. The produced stacked body may be pressed. Examples of preferable pressing include isostatic pressing.

Thereafter, the stacked body is sintered, and thus the co-fired all-solid-state battery 1 can be obtained.

Hereinafter, the present invention is described in further detail on the basis of specific examples. The present invention, however, is not limited by the following examples at all, and can be implemented with an appropriate change within a range not to change the gist of the present invention.

COMPARATIVE EXAMPLE 1

[Production of Garnet-Type Solid Electrolyte Powder]

Raw materials including lithium hydroxide monohydrate ($LiOH.H_2O$), lanthanum hydroxide ($La(OH)_3$), zirconium oxide ($ZrO_2$), gallium oxide (GaO), and aluminum oxide ($Al_2O_3$) were weighed such that the composition of a solid electrolyte became the composition ($Li_{6.4}Ga_{0.05}Al_{0.15}$)$La_3Zr_2O_{12}$ shown in Table 1 below (hereinafter, "($Li_{6.4}Ga_{0.05}Al_{0.15}$)$La_3Zr_2O_{12}$" is sometimes referred to as "LLZ"). Next, water was added to the raw materials, sealed in a 100-ml polyethylene pot, and rotated on a pot rack at 150 rpm for 16 hours to mix the raw materials. Lithium hydroxide monohydrate $LiOH.H_2O$ serving as a Li source was charged in excess of 3 mass % with respect to the target composition, in consideration of Li deficiency during sintering.

Next, the resultant slurry was dried and then calcined in an oxygen gas at 900° C. for 5 hours.

Next, the resultant calcined product to which a mixed solvent of toluene and acetone was added was pulverized for 6 hours with a planetary ball mill and then dried to give a solid electrolyte powder having the composition shown in Table 1.

[Production of Garnet-Type Solid Electrolyte Substrate]

The produced solid electrolyte powder, a butyral resin, and an alcohol were mixed at a mass ratio of 200:15:140, and then the alcohol was removed on a hot plate at 80° C. to give a solid electrolyte powder coated with the butyral resin serving as a binder.

Next, the solid electrolyte powder coated with the butyral resin was pressed at 90 MPa and formed into a tablet using a tableting machine. The resultant solid electrolyte tablet was adequately coated with a mother powder, fired under an oxygen atmosphere at a temperature of 500° C. to remove the butyral resin, and then fired under an oxygen atmosphere at about 1200° C. for 3 hours. Thereafter, the temperature was lowered to give a solid electrolyte sintered body.

A surface of the resultant sintered body was polished to give a garnet-type solid electrolyte substrate (solid electrolyte layer).

[Production of Firing Additive Powder]

Lithium hydroxide monohydrate $LiOH.H_2O$, boron oxide $B_2O_3$, and aluminum oxide $Al_2O_3$ were appropriately weighed, mixed with a mortar, and then calcined at 650° C. for 5 hours. The resultant calcined powder was pulverized with a mortar, mixed, and then fired at 680° C. for 40 hours. The resultant fired powder to which a mixed solvent of toluene and acetone was added was pulverized for 6 hours using a planetary ball mill, and dried to produce a sintering additive powder represented by the composition formula $Li_{2.4}Al_{0.2}BO_3$.

[Production of Co-Fired All-Solid-State Battery]

The produced solid electrolyte powder, a negative electrode active material powder ($Li_4Ti_5O_{12}$ powder (purity: 99% or more)), the produced firing additive powder, and a conductive auxiliary agent powder (carbon nanotube powder (VGCF (registered trademark) manufactured by Showa Denko K.K.) were weight so as to give a volume ratio of 3:4:2:1, and kneaded with an alcohol and a binder to give a negative electrode mixture paste.

Next, the negative electrode mixture paste was applied onto the produced solid electrolyte substrate and dried to give a stacked body. The stacked body was heated at 400° C. to remove the binder and then subjected to a heat treatment under an inert atmosphere at 800° C. for 3 hours to product a stacked body including the solid electrolyte substrate and a negative electrode disposed on the solid electrolyte substrate. Thereafter, a product was obtained by attaching meal lithium serving as a counter and reference electrode onto a surface, which is opposite from the negative electrode, of the solid electrolyte substrate in the stacked body, and sealed in a 2032 coin cell to produce a co-fired all-solid-state battery.

[Production of Negative Electrode Tablet]

The produced solid electrolyte powder and a negative electrode active material powder ($Li_4Ti_5O_{12}$ powder (purity: 99% or more)) were weight so as to give a weight ratio of 1:1, and mixed using a mortar to give a mixed powder. The mixed powder was pressed at 90 MPa and formed into a tablet using a tableting machine. The resultant tablet was subjected to a heat treatment at 800° C. for 5 hours to produce a negative electrode tablet.

COMPARATIVE EXAMPLE 2

A co-fired all-solid-state battery and a negative electrode tablet were produced in the same manner as in Comparative Example 1 except that a $Nb_2O_5$ powder (purity: 99% or more) was used as the negative electrode active material powder.

COMPARATIVE EXAMPLE 3

A co-fired all-solid-state battery and a negative electrode tablet were produced in the same manner as in Comparative Example 1 except that a $Li_3VO_2$ powder (purity: 99% or more) was used as the negative electrode active material powder.

COMPARATIVE EXAMPLE 4

A co-fired all-solid-state battery and a negative electrode tablet were produced in the same manner as in Comparative Example 1 except that a $Li_3V_2(PO_4)_3$ powder (purity: 99% or more) was used as the negative electrode active material powder.

EXAMPLE 1

A mixture obtained by adding water to a lithium hydroxide monohydrate $LiOH.H_2O$ powder and a vanadium pentoxide $V_2O_5$ powder was sealed in a 100-ml polyethylene pot and rotated on a pot rack at 150 rpm for 16 hours for mixing to produce a slurry. The slurry was dried and then calcined in an air atmosphere at 800° C. for 5 hours to produce a calcined powder.

Next, a mixture obtained by adding an alcohol to the calcined powder was sealed in a 100-ml polyethylene pot, rotated on a pot rack at 150 rpm for 16 hours, and pulverized. Thereafter, the resultant powder was fired at 900° C. for 5 hours to give a fired powder.

Next, the fired powder to which a mixed solvent of toluene and acetone was added was pulverized for 6 hours using a planetary ball mill and then dried to give a negative electrode active material powder having the composition shown in Table 1. A co-fired all-solid-state battery and a negative electrode tablet were produced in the same manner as in Comparative Example 1 except that this negative electrode active material powder was used.

EXAMPLE 2

A negative electrode active material powder was produced in the same manner as in Example 1 except that lithium hydroxide monohydrate $LiOH.H_2O$, vanadium pentoxide $V_2O_5$, and silicon oxide $SiO_2$ were used as the raw materials. A co-fired all-solid-state battery and a negative electrode tablet were produced in the same manner as in Comparative Example 1 except that this negative electrode active material powder was used.

EXAMPLE 3

A negative electrode active material powder was produced in the same manner as in Example 1 except that lithium hydroxide monohydrate $LiOH.H_2O$, vanadium pentoxide $V_2O_5$, and germanium oxide $GeO_2$ were used as the raw materials. A co-fired all-solid-state battery and a negative electrode tablet were produced in the same manner as in Comparative Example 1 except that this negative electrode active material was used.

EXAMPLE 4

A negative electrode active material powder was produced in the same manner as in Example 1 except that lithium hydroxide monohydrate $LiOH.H_2O$, vanadium pentoxide $V_2O_5$, titanium oxide $TiO_2$, and germanium oxide $GeO_2$ were used as the raw materials. A co-fired all-solid-state battery and a negative electrode tablet were produced in the same manner as in Comparative Example 1 except that this negative electrode active material was used.

EXAMPLE 5

A negative electrode active material powder was produced in the same manner as in Example 1 except that lithium hydroxide monohydrate $LiOH.H_2O$, aluminum oxide $Al_2O_3$, and vanadium pentoxide $V_2O_5$ were used as the raw materials. A co-fired all-solid-state battery and a negative electrode tablet were produced in the same manner as in Comparative Example 1 except that this negative electrode active material was used.

EXAMPLE 6

A negative electrode active material powder was produced in the same manner as in Example 1 except that lithium hydroxide monohydrate $LiOH.H_2O$, gallium oxide $Ga_2O_5$, and vanadium pentoxide $V_2O_5$ were used as the raw materials. A co-fired all-solid-state battery and a negative electrode tablet were produced in the same manner as in Comparative Example 1 except that this negative electrode active material was used.

EXAMPLE 7

A negative electrode active material powder was produced in the same manner as in Example 1 except that lithium hydroxide monohydrate $LiOH.H_2O$, zinc oxide ZnO, and vanadium pentoxide $V_2O_5$ were used as the raw materials. A co-fired all-solid-state battery and a negative electrode tablet were produced in the same manner as in Comparative Example 1 except that this negative electrode active material was used.

EXAMPLE 8

A negative electrode active material powder was produced in the same manner as in Example 1 except that lithium hydroxide monohydrate $LiOH.H_2O$, aluminum oxide $Al_2O_3$, and vanadium pentoxide $V_2O_5$ were used as the raw materials. A co-fired all-solid-state battery and a negative electrode tablet were produced in the same manner as in Comparative Example 1 except that this negative electrode active material was used.

EXAMPLE 9

A negative electrode active material powder was produced in the same manner as in Example 1 except that lithium hydroxide monohydrate $LiOH.H_2O$, zinc oxide ZnO, and vanadium pentoxide $V_2O_5$ were used as the raw materials. A co-fired all-solid-state battery and a negative electrode tablet were produced in the same manner as in Comparative Example 1 except that this negative electrode active material was used.

EXAMPLE 10

A negative electrode active material powder was produced in the same manner as in Example 1 except that lithium hydroxide monohydrate $LiOH.H_2O$, zinc oxide ZnO, vanadium pentoxide $V_2O_5$, and silicon oxide $SiO_2$ were used as the raw materials. A co-fired all-solid-state battery and a negative electrode tablet were produced in the same manner as in Comparative Example 1 except that this negative electrode active material was used.

EXAMPLE 11

A negative electrode active material powder was produced in the same manner as in Example 1 except that lithium hydroxide monohydrate $LiOH.H_2O$, vanadium pentoxide $V_2O_5$, and phosphorus oxide $P_2O_5$ were used as the raw materials. A co-fired all-solid-state battery and a negative electrode tablet were produced in the same manner as in Comparative Example 1 except that this negative electrode active material was used.

[Evaluation of Negative Electrode Tablets]

Figure 2:
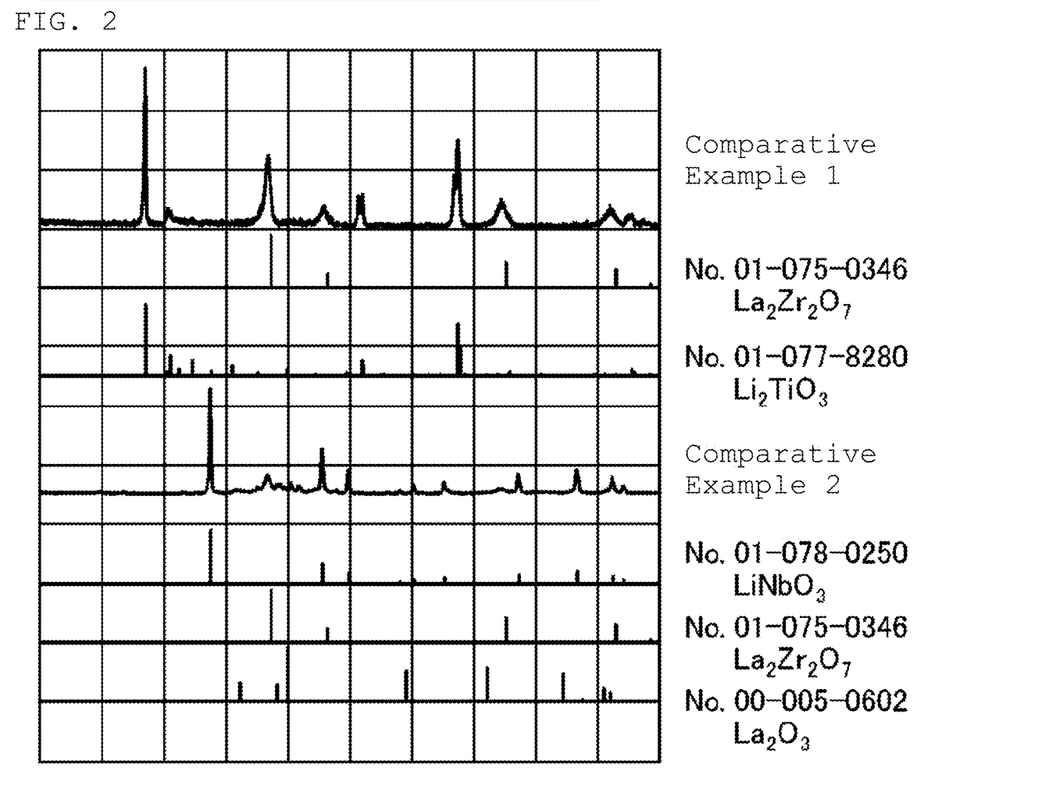
FIG. 2 is a graph illustrating XRD patterns of negative electrode tablets produced in Comparative Examples 1 and 2.
Figure 3:
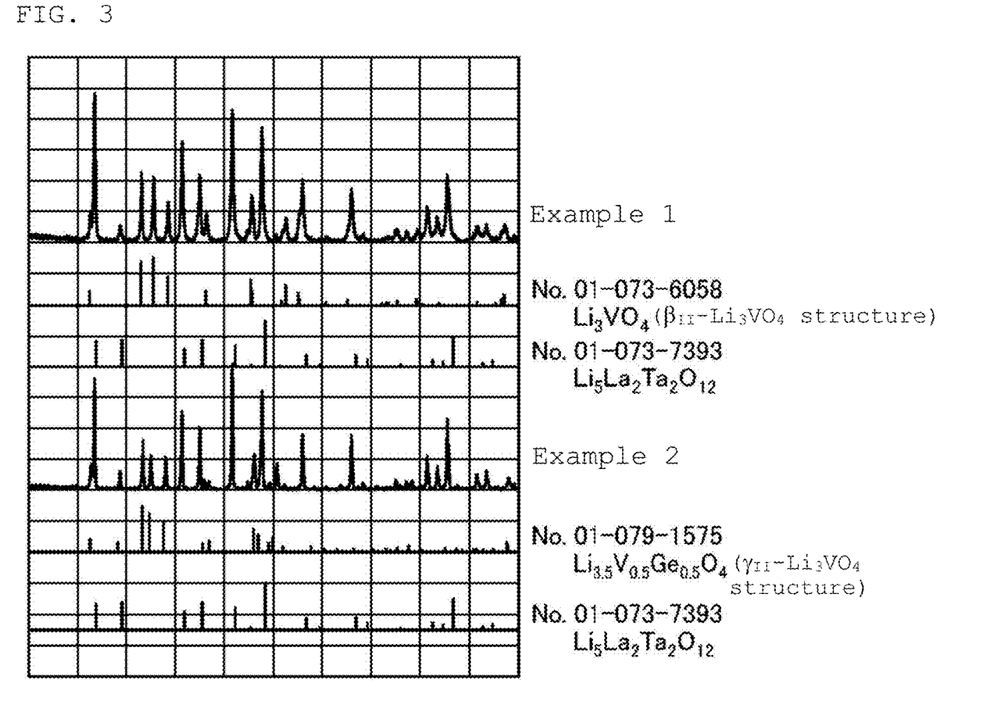
FIG. 3 is a graph illustrating XRD patterns of negative electrode tablets produced in Examples 1 and 2.

The negative electrode tablet produced in each of the comparative examples and the examples was pulverized using a mortar and formed into a powder. The resultant powder was charged into a holder and subjected to XRD measurement under the conditions of a scan speed of 4.0°/min and an angle measuring range of 10° to 60° to evaluate the crystal phase contained in the negative electrode tablet. Further, the crystal structure of the negative electrode active material contained in the negative electrode tablet was evaluated from the result of the XRD measurement. Table 1 and FIGS. 2 and 3 show the evaluation results.

TABLE 1

| | A | B | a | b | x | y | Li/V | | A | B | a | b | x | y | |
|---|---|---|---|---|---|---|---|---|---|---|---|---|---|---|---|
| $Li_4Ti_5O_{12}$ | | | | | | | | — | LLZ | Ga, Al | — | 3 | — | 0.2 | 0 | $La_2ZrO_7 + Li_2TiO_3$ |
| $Nb_2O_5$ | | | | | | | | — | LLZ | Ga, Al | — | 3 | — | 0.2 | 0 | $La_2ZrO_7 + LiNbO_3 + La_2O_3$ |
| $LiVO_2$ | | | | | | | 1 | — | LLZ | Ga, Al | — | 3 | — | 0.2 | 0 | $La_2ZrO_7 + Li_3VO_4 + LaVO_4$ |
| $Li_3V_2(PO_4)_3$ | | | | | | | 1.5 | — | LLZ | Ga, Al | — | 3 | — | 0.2 | 0 | $La_2ZrO_7 + V_2O_3 + Li_3PO_4$ |
| $Li_3VO_4$ | — | — | — | — | 0 | 0 | 3 | $\beta_{II}$-$Li_3VO_4$ | LLZ | Ga, Al | — | 3 | — | 0.2 | 0 | LLZ + $Li_3VO_4$ |
| $Li_{3.2}(V_{0.8}Si_{0.2})O_4$ | — | Si | — | 4 | 0 | 0.2 | 4.0 | $\gamma_{II}$-$Li_3VO_4$ | LLZ | Ga, Al | — | 3 | — | 0.2 | 0 | LLZ + $Li_{3.2}V_{0.8}Si_{0.2}O_4$ |
| $Li_{3.2}(V_{0.8}Ge_{0.2})O_4$ | — | Ge | — | 4 | 0 | 0.2 | 4.0 | $\gamma_{II}$-$Li_3VO_4$ | LLZ | Ga, Al | — | 3 | — | 0.2 | 0 | LLZ + $Li_{3.2}V_{0.8}Ge_{0.2}O_4$ |
| $Li_{3.2}(V_{0.7}Ti_{0.3})O_4$ | — | Ti | — | 4 | 0 | 0.3 | 4.6 | $\gamma_{II}$-$Li_3VO_4$ | LLZ | Ga, Al | — | 3 | — | 0.2 | 0 | LLZ + $Li_{3.2}V_{0.7}Ti_{0.3}O_4$ |
| $(Li_{2.7}Al_{0.1})VO_4$ | Al | — | 3 | — | 0.1 | 0 | 2.7 | $\beta_{II}$-$Li_3VO_4$ | LLZ | Ga, Al | — | 3 | — | 0.2 | 0 | LLZ + $Li_{2.7}Al_{0.1}VO_4$ |
| $(Li_{2.7}Ga_{0.1})VO_4$ | Ga | — | 3 | — | 0.1 | 0 | 2.7 | $\beta_{II}$-$Li_3VO_4$ | LLZ | Ga, Al | — | 3 | — | 0.2 | 0 | LLZ + $Li_{2.7}Ga_{0.1}VO_4$ |
| $(Li_{2.8}Zn_{0.1})VO_4$ | Zn | — | 2 | — | 0.1 | 0 | 2.8 | $\beta_{II}$-$Li_3VO_4$ | LLZ | Ga, Al | — | 3 | — | 0.2 | 0 | LLZ + $Li_{2.8}Zn_{0.1}VO_4$ |
| $(Li_{2.4}Al_{0.2})VO_4$ | Al | — | 3 | — | 0.2 | 0 | 2.4 | $\beta_{II}$-$Li_3VO_4$ | LLZ | Ga, Al | — | 3 | — | 0.2 | 0 | LLZ + $Li_{2.4}Al_{0.2}VO_4$ |
| $(Li_{2.0}Zn_{0.5})VO_4$ | Zn | — | 2 | — | 0.5 | 0 | 2.0 | $\beta_{II}$-$Li_3VO_4$ | LLZ | Ga, Al | — | 3 | — | 0.2 | 0 | LLZ + $Li_{2.0}Zn_{0.5}VO_4$ |
| $(Li_{3.0}Zn_{0.1})(V_{0.8}Si_{0.2})O_4$ | Zn | Si | 2 | 4 | 0.1 | 0.2 | 3.8 | $\gamma_{II}$-$Li_3VO_4$ | LLZ | Ga, Al | — | 3 | — | 0.2 | 0 | LLZ + $Li_{3.0}Zn_{0.1}V_{0.8}Si_{0.2}O_4$ |
| $Li_{3.0}V_{0.7}P_{0.3}O_4$ | — | P | — | 5 | 0 | 0.3 | 4.3 | $\beta_{II}$-$Li_3VO_4$ | LLZ | Ga, Al | — | 3 | — | 0.2 | 0 | LLZ + $Li_{3.0}V_{0.7}P_{0.3}O_4$ |

(✗)LLZ: $(Li_{6.4}Ga_{0.05}Al_{0.15})La_3Zr_2O_{12}$

Table 1 clarifies that the solid electrolyte LLZ remained in the negative electrode even after the firing at 800° C. in Examples 1 to 11 that used the negative electrode active materials containing Li, V, and O and having a mole ratio (Li/V) of a Li content to a V content of 2.0 or more. On the other hand, Table 1 clarifies that LLZ did not remain in the negative electrode and was decomposed after the firing at 800° C. in Comparative Examples 1 to 4 that used no negative electrode active material containing Li, V, and O and having a mole ratio (Li/V) of a Li content to a V content of 2.0 or more.

[Evaluation of Co-Fired All-Solid-State Batteries]

The co-fired all-solid-state battery produced in each of the comparative examples and the examples was subjected to a constant current charge-discharge test at a current density corresponding to 0.05 C and in a potential range of 0.2 V to 3.0 V (vs. Li/Li$^+$) to measure the initial reversible capacitance. Table 2 shows the measured initial reversible capacitance, a theoretical value of the initial reversible capacitance, and (measured initial reversible capacitance)/ (theoretical value of initial reversible capacitance).

TABLE 2

| | Negative electrode active material | | | | | | | | | Solid electrolyte | | |
|---|---|---|---|---|---|---|---|---|---|---|---|---|
| | Composition formula | A | B | a | b | x | y | Li/V | Crystal structure | Composition formula | A | B |
| Comparative Example 1 | Li$_4$Ti$_5$O$_{12}$ | | | | | | | — | — | LLZ | Ga, Al | — |
| Comparative Example 2 | Nb$_2$O$_5$ | | | | | | | — | — | LLZ | Ga, Al | — |
| Comparative Example 3 | LiVO$_2$ | | | | | | | 1 | — | LLZ | Ga, Al | — |
| Comparative Example 4 | Li$_3$V$_2$(PO$_4$)$_3$ | | | | | | | 1.5 | — | LLZ | Ga, Al | — |
| Example 1 | Li$_3$VO$_4$ | — | — | — | — | 0 | 0 | 3 | $\beta_{II}$-Li$_3$VO$_4$ | LLZ | Ga, Al | — |
| Example 2 | Li$_{3.2}$V$_{0.8}$Si$_{0.2}$O$_4$ | — | Si | — | 4 | 0 | 0 | 4.0 | $\gamma_{II}$-Li$_3$VO$_4$ | LLZ | Ga, Al | — |
| Example 3 | Li$_{3.2}$V$_{0.8}$Ge$_{0.2}$O$_4$ | — | Ge | — | 4 | 0 | 0 | 4.0 | $\gamma_{II}$-Li$_3$VO$_4$ | LLZ | Ga, Al | — |
| Example 4 | Li$_{3.2}$V$_{0.7}$Ti$_{0.3}$O$_4$ | — | Ti | — | 4 | 0 | 0 | 4.6 | $\gamma_{II}$-Li$_3$VO$_4$ | LLZ | Ga, Al | — |
| Example 5 | Li$_{2.7}$Al$_{0.1}$VO$_4$ | Al | — | 3 | — | 0 | 0 | 2.7 | $\beta_{II}$-Li$_3$VO$_4$ | LLZ | Ga, Al | — |
| Example 6 | Li$_{2.7}$Ga$_{0.1}$VO$_4$ | Ga | — | 3 | — | 0 | 0 | 2.7 | $\beta_{II}$-Li$_3$VO$_4$ | LLZ | Ga, Al | — |
| Example 7 | Li$_{2.8}$Zn$_{0.1}$VO$_4$ | Zn | — | 2 | — | 0 | 0 | 2.8 | $\beta_{II}$-Li$_3$VO$_4$ | LLZ | Ga, Al | — |
| Example 8 | Li$_{2.4}$Al$_{0.2}$VO$_4$ | Al | — | 3 | — | 0 | 0 | 2.4 | $\beta_{II}$-Li$_3$VO$_4$ | LLZ | Ga, Al | — |
| Example 9 | Li$_{2.0}$Zn$_{0.5}$VO$_4$ | Zn | — | 2 | — | 1 | 0 | 2.0 | $\beta_{II}$-Li$_3$VO$_4$ | LLZ | Ga, Al | — |
| Example 10 | Li$_{3.0}$Zn$_{0.1}$V$_{0.8}$Si$_{0.2}$O$_4$ | Zn | Si | 2 | 4 | 0 | 0 | 3.8 | $\gamma_{II}$-Li$_3$VO$_4$ | LLZ | Ga, Al | — |
| Example 11 | Li$_{3.0}$V$_{0.7}$P$_{0.3}$O$_4$ | — | P | — | 5 | 0 | 0 | 4.3 | $\beta_{II}$-Li$_3$VO$_4$ | LLZ | Ga, Al | — |

| | Solid electrolyte | | | | Volume of conductive auxiliary agent/Volume of negative electrode | Sintering additive | | C1 (mAh/g) | C0 (mAh/g) | C1/C0 |
|---|---|---|---|---|---|---|---|---|---|---|
| | a | b | x | y | | Composition formula | Li/B | | | |
| Comparative Example 1 | 3 | — | 0.2 | 0 | 0.11 | Li$_{2.4}$Al$_{0.2}$BO$_3$ | 2.4 | 1 or less | 175 | 0.01 or less |
| Comparative Example 2 | 3 | — | 0.2 | 0 | 0.11 | Li$_{2.4}$Al$_{0.2}$BO$_3$ | 2.4 | 1 or less | 202 | 0.01 or less |
| Comparative Example 3 | 3 | — | 0.2 | 0 | 0.11 | Li$_{2.4}$Al$_{0.2}$BO$_3$ | 2.4 | 1 or less | 149 | 0.01 or less |
| Comparative Example 4 | 3 | — | 0.2 | 0 | 0.11 | Li$_{2.4}$Al$_{0.2}$BO$_3$ | 2.4 | 1 or less | 132 | 0.01 or less |
| Example 1 | 3 | — | 0.2 | 0 | 0.11 | Li$_{2.4}$Al$_{0.2}$BO$_3$ | 2.4 | 356 | 395 | 0.90 |
| Example 2 | 3 | — | 0.2 | 0 | 0.11 | Li$_{2.4}$Al$_{0.2}$BO$_3$ | 2.4 | 270 | 323 | 0.91 |
| Example 3 | 3 | — | 0.2 | 0 | 0.11 | Li$_{2.4}$Al$_{0.2}$BO$_3$ | 2.4 | 259 | 303 | 0.95 |
| Example 4 | 3 | — | 0.2 | 0 | 0.11 | Li$_{2.4}$Al$_{0.2}$BO$_3$ | 2.4 | 212 | 274 | 0.82 |
| Example 5 | 3 | — | 0.2 | 0 | 0.11 | Li$_{2.4}$Al$_{0.2}$BO$_3$ | 2.4 | 371 | 393 | 0.94 |
| Example 6 | 3 | — | 0.2 | 0 | 0.11 | Li$_{2.4}$Al$_{0.2}$BO$_3$ | 2.4 | 365 | 381 | 0.93 |
| Example 7 | 3 | — | 0.2 | 0 | 0.11 | Li$_{2.4}$Al$_{0.2}$BO$_3$ | 2.4 | 376 | 380 | 0.94 |
| Example 8 | 3 | — | 0.2 | 0 | 0.11 | Li$_{2.4}$Al$_{0.2}$BO$_3$ | 2.4 | 318 | 391 | 0.81 |
| Example 9 | 3 | — | 0.2 | 0 | 0.11 | Li$_{2.4}$Al$_{0.2}$BO$_3$ | 2.4 | 302 | 332 | 0.84 |
| Example 10 | 3 | — | 0.2 | 0 | 0.11 | Li$_{2.4}$Al$_{0.2}$BO$_3$ | 2.4 | 285 | 311 | 0.92 |
| Example 11 | 3 | — | 0.2 | 0 | 0.11 | Li$_{2.4}$Al$_{0.2}$BO$_3$ | 2.4 | 206 | 289 | 0.71 |

(※1)LLZ: (Li$_{6.4}$Ga$_{0.05}$Al$_{0.15}$)La$_3$Zr$_2$O$_{12}$
(※2)C1: initial reversible capacitance,
C0: theoretical value of initial reversible capacitance The results shown in Table 2 are that the (measured initial reversible capacitance)/(theoretical value of initial reversible capacitance) was high in Examples 1 to 11 where the solid electrolyte LLZ remained in the negative electrode even after the firing at 800° C. On the other hand, the results are that the (measured initial reversible capacitance)/(theoretical value of initial reversible capacitance) was low in Comparative Examples 1 to 4 where the solid electrolyte LLZ did not remain in the negative electrode after the firing at 800° C.

EXAMPLES 12 TO 18

A co-fired all-solid-state battery and a negative electrode tablet were produced in the same manner as in Comparative Example 1 except that the negative electrode active material and the garnet-type solid electrolyte shown in Tables 3 and 4 were used, and the crystal structure of the negative electrode active material contained in the negative electrode tablet and the initial reversible capacitance of the co-fired all-solid-state battery were evaluated. Tables 3 and 4 show the results.

additive was used, and the initial reversible capacitance of the co-fired all-solid-state battery was evaluated. Table 5 shows the results.

COMPARATIVE EXAMPLE 7 AND EXAMPLE 22

A co-fired all-solid-state battery and a negative electrode tablet were produced in the same manner as in Comparative Example 3 except that no garnet-type solid electrolyte was used, and the crystal structure of the negative electrode active material contained in the negative electrode tablet and the initial reversible capacitance of the co-fired all-solid-state battery were evaluated. Table 5 shows the results.

COMPARATIVE EXAMPLE 8 AND EXAMPLES 19 TO 21

A co-fired all-solid-state battery and a negative electrode tablet were produced in the same manner as in Example 1 except that the sintering additive shown in Table 5 was used,

TABLE 3

| | A | B | a | b | x | y | Li/V | | | A | B | a | b | x | y |
|---|---|---|---|---|---|---|---|---|---|---|---|---|---|---|---|
| $Li_3VO_4$ | — | — | — | — | 0 | 0 | 3 | $\beta_{II}$-$Li_3VO_4$ | $Li_{6.6}La_3(Zr_{1.6}Ta_{0.4})O_{12}$ | — | Ta | — | 5 | 0 | 0.4 |
| $Li_{3.2}V_{0.8}Si_{0.2}O_4$ | — | Si | — | 4 | 0 | 0.2 | 4 | $\gamma_{II}$-$Li_3VO_4$ | $Li_{6.6}La_3(Zr_{1.6}Ta_{0.4})O_{12}$ | — | Ta | — | 5 | 0 | 0.4 |
| $Li_3VO_4$ | — | — | — | — | 0 | 0 | 3 | $\beta_{II}$-$Li_3VO_4$ | $(Li_{6.4}Al_{0.2})La_3Zr_2O_{12}$ | Al | — | 3 | — | 0.2 | 0 |
| $Li_3VO_4$ | — | — | — | — | 0 | 0 | 3 | $\beta_{II}$-$Li_3VO_4$ | $(Li_{6.4}Ga_{0.15}Sc_{0.05})La_3Zr_2O_{12}$ | Ga, Sc | — | 3 | — | 0.2 | 0 |
| $Li_3VO_4$ | — | — | — | — | 0 | 0 | 3 | $\beta_{II}$-$Li_3VO_4$ | $Li_{6.75}La_3(Zr_{1.75}Nb_{0.25})O_{12}$ | — | Nb | — | 5 | 0 | 0.25 |
| $Li_3VO_4$ | — | — | — | — | 0 | 0 | 3 | $\beta_{II}$-$Li_3VO_4$ | $(Li_{6.45}Al_{0.1})La_3(Zr_{1.75}Nb_{0.25})O_{12}$ | Al | Nb | 3 | 5 | 0.1 | 0.25 |
| $Li_3VO_4$ | — | — | — | — | 0 | 0 | 3 | $\beta_{II}$-$Li_3VO_4$ | $(Li_{6.45}Al_{0.1})La_3(Zr_{1.75}Bi_{0.25})O_{12}$ | Al | Bi | 3 | 5 | 0.1 | 0.25 |

TABLE 4

| | Negative electrode active material | | Volume of conductive auxiliary agent/Volume of negative electrode | Sintering additive | | | C1 (mAh/g) | C0 (mAh/g) | C1/C0 |
|---|---|---|---|---|---|---|---|---|---|
| | Composition formula | Li/V | Solid electrolyte Composition formula | | Composition formula | Li/B | | | |
| Example 12 | $Li_3VO_4$ | 3 | $Li_{6.6}La_3(Zr_{1.6}Ta_{0.4})O_{12}$ | 0.11 | $Li_{2.4}Al_{0.2}BO_3$ | 2.4 | 345 | 395 | 0.87 |
| Example 13 | $Li_{3.2}V_{0.8}Si_{0.2}O_4$ | 4 | $Li_{6.6}La_3(Zr_{1.6}Ta_{0.4})O_{12}$ | 0.11 | $Li_{2.4}Al_{0.2}BO_3$ | 2.4 | 283 | 323 | 0.91 |
| Example 14 | $Li_3VO_4$ | 3 | $(Li_{6.4}Al_{0.2})La_3Zr_2O_{12}$ | 0.11 | $Li_{2.4}Al_{0.2}BO_3$ | 2.4 | 310 | 395 | 0.79 |
| Example 15 | $Li_3VO_4$ | 3 | $(Li_{6.4}Ga_{0.15}Sc_{0.05})La_3Zr_2O_{12}$ | 0.11 | $Li_{2.4}Al_{0.2}BO_3$ | 2.4 | 396 | 395 | 0.95 |
| Example 16 | $Li_3VO_4$ | 3 | $Li_{6.75}La_3(Zr_{1.75}Nb_{0.25})O_{12}$ | 0.11 | $Li_{2.4}Al_{0.2}BO_3$ | 2.4 | 341 | 395 | 0.86 |
| Example 17 | $Li_3VO_4$ | 3 | $(Li_{6.45}Al_{0.1})La_3(Zr_{1.75}Nb_{0.25})O_{12}$ | 0.11 | $Li_{2.4}Al_{0.2}BO_3$ | 2.4 | 332 | 395 | 0.84 |
| Example 18 | $Li_3VO_4$ | 3 | $(Li_{6.45}Al_{0.1})La_3(Zr_{1.75}Bi_{0.25})O_{12}$ | 0.11 | $Li_{2.4}Al_{0.2}BO_3$ | 2.4 | 347 | 395 | 0.88 |

(※)C1: initial reversible capacitance, C0: theoretical value of initial reversible capacitance Tables 3 and 4 clarify that it is possible to obtain a high (initial reversible capacitance)/(theoretical value of initial reversible capacitance) theoretical value even in the cases of using various garnet-type solid electrolytes containing Li, La, Zr, and O, as long as the negative electrode active material contains Li, V, and O and has a mole ratio (Li/V) of a Li content to a V content of 2.0 or more and the garnet-type solid electrolyte contains Li, La, Zr, and O.

COMPARATIVE EXAMPLES 5 AND 6

A co-fired all-solid-state battery was produced in the same manner as Comparative Example 4 except that no sintering and the crystal structure of the negative electrode active material contained in the negative electrode tablet and the initial reversible capacitance of the co-fired all-solid-state battery were evaluated. Table 5 shows the results.

EXAMPLE 23

A co-fired all-solid-state battery and a negative electrode tablet were produced in the same manner as in Example 1 except that no conductive auxiliary agent was used, and the crystal structure of the negative electrode active material contained in the negative electrode tablet and the initial reversible capacitance of the co-fired all-solid-state battery were evaluated. Table 5 shows the results.

TABLE 5

| | Negative electrode active material | | | | | | | | | Solid electrolyte | | |
|---|---|---|---|---|---|---|---|---|---|---|---|---|
| | Composition formula | A | B | a | b | x | y | Li/V | Crystal structure | Composition formula | A | B |
| Comparative Example 5 | $LiVO_2$ | | | | | | | 1 | — | LLZ | Ga, Al | — |
| Comparative Example 6 | $Li_3V_2(PO_4)_3$ | | | | | | | 1.5 | — | LLZ | Ga, Al | — |
| Comparative Example 7 | $Li_3VO_4$ | — | — | — | — | 0 | 0 | 3 | $\beta_{II}$-$Li_3VO_4$ | — | Ga, Al | — |
| Comparative Example 8 | $Li_3VO_4$ | — | — | — | — | 0 | 0 | 3 | $\beta_{II}$-$Li_3VO_4$ | LLZ | Ga, Al | — |
| Example 19 | $Li_3VO_4$ | — | — | — | — | 0 | 0 | 3 | $\beta_{II}$-$Li_3VO_4$ | LLZ | Ga, Al | — |
| Example 20 | $Li_3VO_4$ | — | — | — | — | 0 | 0 | 3 | $\beta_{II}$-$Li_3VO_4$ | LLZ | Ga, Al | — |
| Example 21 | $Li_3VO_4$ | — | — | — | — | 0 | 0 | 3 | $\beta_{II}$-$Li_3VO_4$ | LLZ | Ga, Al | — |
| Example 22 | $Li_3VO_4$ | — | — | — | — | 0 | 0 | 3 | $\beta_{II}$-$Li_3VO_4$ | LLZ | Ga, Al | — |
| Example 23 | $Li_3VO_4$ | — | — | — | — | 0 | 0 | 3 | $\beta_{II}$-$Li_3VO_4$ | LLZ | Ga, Al | — |

| | Solid electrolyte | | | | Volume of conductive auxiliary agent/Volume of negative electrode | Sintering additive | | C1 (mAh/g) | C0 (mAh/g) | C1/C0 |
|---|---|---|---|---|---|---|---|---|---|---|
| | a | b | x | y | | Composition formula | Li/B | | | |
| Comparative Example 5 | 3 | — | 0.2 | 0 | 0.11 | — | — | 1 or less | | |
| Comparative Example 6 | 3 | — | 0.2 | 0 | 0.11 | — | — | 1 or less | | |
| Comparative Example 7 | — | — | 0.2 | 0 | 0.11 | $Li_{2.4}Al_{0.2}BO_3$ | 2.4 | 10 | 395 | 0.03 |
| Comparative Example 8 | 3 | — | 0.2 | 0 | 0.11 | $B_2O_3$ | — | 12 | 395 | 0.03 |
| Example 19 | 3 | — | 0.2 | 0 | 0.11 | $Li_{2.4}Al_{0.2}BO_3$ | 2.4 | 356 | 395 | 0.90 |
| Example 20 | 3 | — | 0.2 | 0 | 0.11 | $Li_4B_2O_5$ | 2.0 | 343 | 395 | 0.87 |
| Example 21 | 3 | — | 0.2 | 0 | 0.11 | $Li_3BO_3$ | 3.0 | 345 | 395 | 0.87 |
| Example 22 | 3 | — | 0.2 | 0 | 0.11 | — | — | 55 | 395 | 0.14 |
| Example 23 | 3 | — | 0.2 | 0 | 0 | $Li_{2.4}Al_{0.2}BO_3$ | 2.4 | 44 | 395 | 0.11 |

(※1)LLZ: $(Li_{6.4}Ga_{0.05}Al_{0.15})La_3Zr_2O_{12}$
(※2)C1: initial reversible capacitance, C0: theoretical value of initial reversible capacitance Table 5 clarifies that the co-fired all-solid-state batteries that contained the negative electrode active material having a Li/V value of less than 2 and that were produced in Comparative Examples 5 and 6 had a low (initial reversible capacitance)/(theoretical value of initial reversible capacitance) value.

The co-fired all-solid-state battery that contained no garnet-type solid electrolyte and was produced in Comparative Example 8 had a low (initial reversible capacitance)/(theoretical value of initial reversible capacitance) value.

A co-fired all-solid-state battery according to the present invention includes a negative electrode, a solid electrolyte layer, and a positive electrode. The negative electrode contains a negative electrode active material and a garnet-type solid electrolyte. The solid electrolyte layer is disposed on the negative electrode. The positive electrode is disposed on the solid electrolyte layer. The negative electrode active material contains Li, V, and O. The negative electrode active material has a mole ratio (Li/V) of a Li content to a V content of 2.0 or more. The garnet-type solid electrolyte contains Li, La, Zr, and O. Therefore, it is possible to suppress the progress of an undesired reaction such as a reaction between the solid electrolyte and the negative electrode active material during co-firing. Accordingly, the use of the negative electrode active material containing Li, V, and O and the use of the garnet-type solid electrolyte containing Li, La, Zr, and O are capable of attaining the co-fired all-solid-state battery having good characteristics such as excellent reversible capacitance.

The negative electrode active material is preferably a negative electrode active material represented by a general formula $(Li_{[3-ax+(5-b)y]}A_x)(V_{1-y}B_y)O_4$ (A is at least one element selected from the group consisting of Mg, Al, Ga, and Zn; B is at least one element selected from the group consisting of Zn, Al, Ga, Si, Ge, P, and Ti; x and y satisfy $0 \leq x \leq 1.0$ and $0 \leq y \leq 0.6$, respectively; and a is an average valence of A, and b is an average valence of B).

The negative electrode active material preferably has a $\beta_{II}$-$Li_3VO_4$ structure or a $\gamma_{II}$-$Li_3VO_4$ structure. This configuration is capable of increasing the energy density of the co-fired all-solid-state battery.

The negative electrode active material preferably has a $\gamma_{II}$-$Li_3VO_4$ structure.

The garnet-type solid electrolyte is preferably a garnet-type solid electrolyte represented by a general formula $(Li_{[7-ax-(b-4)y]}A_x)La_3(Zr_{2-y}B_y)O_{12}$ (A is at least one element selected from the group consisting of Ga, Al, Mg, Zn, and Sc; B is at least one element selected from the group consisting of Nb, Ta, W, Te, Mo, and Bi; x and y satisfy $0 \leq x \leq 0.5$ and $0 \leq y \leq 2.0$, respectively; and a is an average valence of A, and b is an average valence of B). The garnet-type solid electrolyte represented by the general formula has high ion conductivity. Therefore, the use of the garnet-type solid electrolyte represented by the general formula enables an improvement of charge and discharge rate characteristics of the co-fired all-solid-state battery.

The negative electrode preferably further contains a conductive auxiliary agent and has a volume proportion of the conductive auxiliary agent (volume of conductive auxiliary agent/volume of negative electrode)×100) of 0.1% or more and 35% or less.

The negative electrode may further contain a sintering additive. In this case, the sintering additive preferably contains Li, M, and O (M is at least one element other than Li and O).

The sintering additive may contain Li, B, and O. In this case, the sintering additive preferably has a mole ratio (Li/B) of a Li content to a B content of 2.0 or more. This sintering additive has a low-melting property to allow easy progress of liquid-phase sintering and thus enable densification of the negative electrode at a lower temperature. Further, the sintering additive that is made to have the above composition is capable of suppressing a side reaction between the sintering additive and the negative electrode active material during co-firing.

DESCRIPTION OF REFERENCE SYMBOLS

1: Co-fired all-solid-state battery
11: Positive electrode
12: Negative electrode
13: Solid electrolyte layer

The invention claimed is:

1. A co-fired all-solid-state battery comprising:
a negative electrode containing a negative electrode active material and a garnet-type solid electrolyte, the negative electrode active material containing Li, V, and O and having a mole ratio (Li/V) of a Li content to a V content of 2.0 or more, and the garnet-type solid electrolyte containing Li, La, Zr, and O;
a positive electrode; and
a solid electrolyte layer between the negative electrode and the positive electrode.

2. The co-fired all-solid-state battery according to claim 1, wherein the negative electrode active material is a composite oxide.

3. The co-fired all-solid-state battery according to claim 1, wherein the negative electrode active material is represented by $(Li_{[3-ax+(5-b)y]}A_x)(V_{1-y}B_y)O_4$, wherein A is at least one element selected from the group consisting of Mg, Al, Ga, and Zn; B is at least one element selected from the group consisting of Zn, Al, Ga, Si, Ge, P, and Ti; $0 \leq x \leq 1.0$; $0 \leq y \leq 0.6$; a is an average valence of A; and b is an average valence of B.

4. The co-fired all-solid-state battery according to claim 3, wherein the Li is partially substituted with Na, K, Ca, Fe, Cr, or Co.

5. The co-fired all-solid-state battery according to claim 4, wherein the V is partially substituted with Zn, Al, Ga, Sn, As, Mo, W, Fe, Cr, or Co.

6. The co-fired all-solid-state battery according to claim 3, wherein the V is partially substituted with Zn, Al, Ga, Sn, As, Mo, W, Fe, Cr, or Co.

7. The co-fired all-solid-state battery according to claim 1, wherein the negative electrode active material has a $\beta_{II}$-$Li_3VO_4$ structure or a $\gamma_{II}$-$Li_3VO_4$ structure.

8. The co-fired all-solid-state battery according to claim 1, wherein the negative electrode active material has a $\gamma_{II}$-$Li_3VO_4$ structure.

9. The co-fired all-solid-state battery according to claim 1, wherein the negative electrode active material is selected from $Li_3VO_4$, $Li_{3.2}V_{0.8}Si_{0.2}O_4$, $Li_{3.2}V_{0.8}Ge_{0.2}O_4$, $Li_{3.2}V_{0.7}Ti_{0.3}O_4$, $Li_{2.7}Al_{0.1}VO_4$, $Li_{2.4}Al_{0.2}VO_4$, $Li_{2.7}Ga_{0.1}VO_4$, $Li_{2.8}Zn_{0.1}VO_4$, $Li_{2.0}Zn_{0.5}VO_4$, $Li_{3.0}Zn_{0.1}V_{0.8}Si_{0.2}O_4$, and $Li_{3.0}V_{0.7}P_{0.3}O_4$.

10. The co-fired all-solid-state battery according to claim 1, wherein a content of the negative electrode active material in the negative electrode is 20 vol % to 80 vol %.

11. The co-fired all-solid-state battery according to claim 1, wherein the negative electrode active material is in the form of negative electrode active material grains, and the negative electrode active material grains have an average grain size of 0.005 μm to 5.0 μm.

12. The co-fired all-solid-state battery according to claim 3, wherein the garnet-type solid electrolyte is represented by $(Li_{[7-ax-(b-4)y]}A_x)La_3(Zr_{2-y}B_y)O_{12}$, wherein A is at least one element selected from the group consisting of Ga, Al, Mg, Zn, and Sc; B is at least one element selected from the group consisting of Nb, Ta, W, Te, Mo, and Bi; $0 \leq x \leq 0.5$; $0 \leq y \leq 2.0$; a is an average valence of A; and b is an average valence of B.

13. The co-fired all-solid-state battery according to claim 3, wherein the garnet-type solid electrolyte is selected from $(Li_{6.4}Ga_{0.05}Al_{0.15})La_3Zr_2O_{12}$, $Li_{6.6}La_3(Zr_{1.6}Ta_{0.4})O_{12}$, $Li_{6.6}La_3(Zr_{1.6}Ta_{0.4})O_{12}$, $(Li_{6.4}Al_{0.2})La_3Zr_2O_{12}$, $(Li_{6.4}Ga_{0.15}Sc_{0.05})La_3Zr_2O_{12}$, $Li_{6.75}La_3Zr_{1.75}Nb_{0.25}Zr_2O_{12}$, $(Li_{6.45}Al_{0.1})La_3(Zr_{1.75}Nb_{0.25})O_{12}$, and $(Li_{6.45}Al_{0.1})La_3(Zr_{1.75}Bi_{0.25})O_{12}$.

14. The co-fired all-solid-state battery according to claim 1, wherein the garnet-type solid electrolyte is represented by $(Li_{[7-ax-(b-4)y]}A_x)La_3(Zr_{2-y}B_y)O_{12}$, wherein A is at least one element selected from the group consisting of Ga, Al, Mg, Zn, and Sc; B is at least one element selected from the group consisting of Nb, Ta, W, Te, Mo, and Bi; $0 \leq x \leq 0.5$; $0 \leq y \leq 2.0$; a is an average valence of A; and b is an average valence of B.

15. The co-fired all-solid-state battery according to claim 1, wherein the garnet-type solid electrolyte is selected from $(Li_{6.4}Ga_{0.05}Al_{0.15})La_3Zr_2O_{12}$, $Li_{6.6}La_3(Zr_{1.6}Ta_{0.4})O_{12}$, $Li_{6.6}La_3(Zr_{1.6}Ta_{0.4})O_{12}$, $(Li_{6.4}Al_{0.2})La_3Zr_2O_{12}$, $(Li_{6.4}Ga_{0.15}Sc_{0.05})La_3Zr_2O_{12}$, $Li_{6.75}La_3Zr_{1.75}Nb_{0.25}Zr_2O_{12}$, $(Li_{6.45}Al_{0.1})La_3(Zr_{1.75}Nb_{0.25})O_{12}$, and $(Li_{6.45}Al_{0.1})La_3(Zr_{1.75}Bi_{0.25})O_{12}$.

16. The co-fired all-solid-state battery according to claim 1, wherein a content of the garnet-type solid electrolyte in the negative electrode is 5 vol % to 60 vol %.

17. The co-fired all-solid-state battery according to claim 1, wherein
the negative electrode further contains a conductive auxiliary agent, and
the negative electrode has a volume proportion of the conductive auxiliary agent ((volume of conductive auxiliary agent/volume of negative electrode)×100) of 0.1% to 35%.

18. The co-fired all-solid-state battery according to claim 1, wherein
the negative electrode further contains a sintering additive, and
the sintering additive contains Li, M, and O, with M being at least one element other than Li and O.

19. The co-fired all-solid-state battery according to claim 18, wherein
the sintering additive contains Li, B, and O, and
the sintering additive has a mole ratio (Li/B) of a Li content to a B content of 2.0 or more.

20. The co-fired all-solid-state battery according to claim 1, wherein the solid electrolyte layer contains the garnet-type solid electrolyte contained in the negative electrode.

* * * * *